(12) United States Patent
Noma

(10) Patent No.: US 7,292,415 B2
(45) Date of Patent: Nov. 6, 2007

(54) FERROMAGNETIC LAYERED MATERIAL HAVING RELIABLE UNIAXIAL ANISOTROPY

(75) Inventor: Kenji Noma, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/328,437

(22) Filed: Dec. 23, 2002

(65) Prior Publication Data
US 2003/0128484 A1 Jul. 10, 2003

(30) Foreign Application Priority Data
Dec. 25, 2001 (JP) ............................ 2001-391047

(51) Int. Cl.
G11B 5/39 (2006.01)
B32B 15/01 (2006.01)
H01L 43/00 (2006.01)

(52) U.S. Cl. ............... 360/324.12; 428/611; 338/32 R

(58) Field of Classification Search ............ 360/324.1, 360/324.12, 126; 324/252, 207.21; 338/32 R, 338/32 H; 428/611
See application file for complete search history.

(56) References Cited

U.S. PATENT DOCUMENTS

| | | | | |
|---|---|---|---|---|
| 3,921,218 A * | 11/1975 | Kayser | ...................... | 360/316 |
| 4,847,584 A * | 7/1989 | Pant | ......................... | 338/32 R |
| 5,768,069 A * | 6/1998 | Mauri | ........................ | 360/314 |
| 5,774,394 A | 6/1998 | Chen et al. | .................. | 365/158 |
| 5,896,252 A | 4/1999 | Kanai | ........................ | 360/113 |
| 5,930,085 A * | 7/1999 | Kitade et al. | .......... | 360/324.11 |
| 5,930,164 A * | 7/1999 | Zhu | ............................ | 365/158 |
| 6,022,633 A * | 2/2000 | Hayashi et al. | ............ | 428/692 |
| 6,088,195 A * | 7/2000 | Kamiguchi et al. | .... | 360/324.12 |
| 6,101,072 A * | 8/2000 | Hayashi | ....................... | 360/324 |
| 6,178,073 B1 * | 1/2001 | Hayashi | ................. | 360/324.11 |
| 6,245,450 B1 | 6/2001 | Kawawake et al. | ......... | 428/692 |

(Continued)

FOREIGN PATENT DOCUMENTS

EP 1 033 764 A2 9/2000

(Continued)

OTHER PUBLICATIONS

Shinoura et al.; "Soft Magnetic Properties of Electrodeposited Conife Films"; *IEE Translation Journal on Magnetics in Japan*; vol. 9, No. 5; pp. 118-123; Sep. 1, 1994; New York.

(Continued)

*Primary Examiner*—Brian E. Miller
(74) *Attorney, Agent, or Firm*—Greer, Burns & Crain, Ltd.

(57) ABSTRACT

A magnetoresistive film includes a pinned ferromagnetic layer, a free ferromagnetic layer, an intermediate layer interposed between the pinned and free ferromagnetic layers, and a pinning layer contacting the pinned ferromagnetic layer. The free ferromagnetic layer is made of a ferromagnetic layered material including a cobalt nickel iron alloy layer, and a cobalt iron alloy layer laid over the cobalt nickel iron alloy layer. It has been demonstrated that the cobalt nickel iron alloy layer serves to reliably establish the uniaxial magnetic anisotropy in the cobalt iron alloy layer. Moreover, even if the thickness of the cobalt nickel iron alloy layer as well as the cobalt iron alloy layer is reduced, the uniaxial magnetic anisotropy can surely be maintained in the ferromagnetic layered material.

14 Claims, 6 Drawing Sheets

U.S. PATENT DOCUMENTS

| | | | |
|---|---|---|---|
| 6,275,033 B1 * | 8/2001 | Kools | 324/252 |
| 6,325,900 B1 * | 12/2001 | Komuro et al. | 204/192.2 |
| 6,356,420 B1 * | 3/2002 | Everitt | 360/324.12 |
| 6,369,993 B1 * | 4/2002 | Hayashi | 360/327.2 |
| 6,490,131 B2 * | 12/2002 | Sano et al. | 360/126 |
| 6,723,449 B2 * | 4/2004 | Kudo et al. | 428/611 |
| 6,828,046 B2 * | 12/2004 | Ikeda et al. | 428/812 |
| 2001/0002869 A1 * | 6/2001 | Hayashi | 360/324.12 |
| 2003/0095357 A1 * | 5/2003 | Kudo et al. | 360/126 |

FOREIGN PATENT DOCUMENTS

| | | |
|---|---|---|
| JP | 7-029735 | 1/1995 |
| JP | 10-294217 | 11/1998 |
| WO | WO 99/01778 | 1/1999 |

OTHER PUBLICATIONS

Liu, Xiaomin et al., "Easy Axis Dispersion in High-Moment Fe-Co-Ni Thin Films Electrodeposited on Various Underlayers"; *IEEE Transactions on Magnetics in Japan*; vol. 38, No. 5, Sep. 2002, 2661-2663.

* cited by examiner

CoFe/CoNiFe Free Ferromagnetic Layer

CoFe/NiFe Free Ferromagnetic Layer

FERROMAGNETIC LAYERED MATERIAL HAVING RELIABLE UNIAXIAL ANISOTROPY

BACKGROUND OF THE INVENTION

1. Field of the Invention

The present invention relates to a magnetoresistive film including: a pinned ferromagnetic layer; a free ferromagnetic layer; an intermediate layer interposed between the pinned and free ferromagnetic layers; and a pinning layer, such as an antiferromagnetic layer, contacting the pinned ferromagnetic layer.

2. Description of the Prior Art

A magnetoresistive element is in general used to read out information data from a magnetic recording disk in a magnetic recording medium drive or storage device such as a hard disk drive (HDD). A magnetoresistive film such as a spin valve film is utilized in the magnetoresistive element, for example. The electric resistance of the spin valve film varies in response to the rotation of the magnetization in the free ferromagnetic layer. Such variation in the electric resistance enables discrimination of magnetic bit data on the magnetic recording disk.

In general, the free ferromagnetic layer of the spin valve film includes a nickel iron (NiFe) alloy layer and a cobalt iron (CoFe) alloy layer superposed on the nickel iron alloy layer. The nickel iron alloy layer is supposed to contribute to establishment of the uniaxial magnetic anisotropy in the cobalt iron alloy layer. The establishment of the uniaxial magnetic anisotropy leads to a reliable rotation of the magnetization in the free ferromagnetic layer which receives a magnetic field from the magnetic recording disk. A reliable discrimination of magnetic bit data can be achieved in this manner.

A higher density of the magnetic recordation may require a further enhanced output of the magnetoresistive element. The output of the magneto resistive element depends upon the thickness of the free ferromagnetic layer, for example. A reduced thickness of the free ferromagnetic layer is supposed to enhance the output of the magnetoresistive element as required. However, if the thickness of the nickel iron alloy layer is reduced in the free ferromagnetic layer, the uniaxial anisotropy is hardly established in the free ferromagnetic layer. Loss of the uniaxial anisotropy tends to hinder a reliable discrimination of magnetic bit data.

SUMMARY OF THE INVENTION

It is accordingly an object of the present invention to provide a ferromagnetic layered material capable of reliably establishing the uniaxial anisotropy irrespective of a reduction in the thickness.

According to the present invention, there is provided a ferromagnetic layered material comprising: a cobalt nickel iron alloy layer; and a cobalt iron alloy layer laid over the cobalt nickel iron alloy layer.

It has been demonstrated that the cobalt nickel iron alloy layer serves to reliably establish the uniaxial magnetic anisotropy in the cobalt iron alloy layer. Moreover, even if the thickness of the cobalt nickel iron alloy layer as well as the cobalt iron alloy layer is reduced, the uniaxial magnetic anisotropy can surely be maintained in the ferromagnetic layered material.

The ferromagnetic layered material may be utilized as a free ferromagnetic layer in a magnetoresistive film designed to discriminate magnetic bit data on a magnetic recording disk in a magnetic recording medium drive such as a hard disk drive (HDD). The magnetoresistive film may include, for example, a pinned ferromagnetic layer, a free ferromagnetic layer comprising the aforementioned ferromagnetic layered material, an intermediate layer interposed between the pinned and free ferromagnetic layers, and a pinning layer contacting the pinned ferromagnetic layer. The intermediate layer may be electrically conductive or insulative. The pinning layer may be an antiferromagnetic layer or a specific hard magnetic material layer.

Here, the cobalt nickel iron alloy layer may contain cobalt of x[atom %], nickel of y[atom %] and iron of z[atom %] based on the following expression:

$$100 = x+y+z$$

$$41 \leq x \leq 72$$

$$z = y+10$$

The cobalt nickel iron alloy layer of this type enables a reliable establishment of the uniaxial magnetic anisotropy in the free ferromagnetic layer even if the thickness of the free ferromagnetic layer is reduced. Likewise, the cobalt nickel iron alloy layer may contain cobalt of x[atom %], nickel of y[atom %] and iron of z[atom %] based on the following expression:

$$100 = x+y+z$$

$$40 \leq x \leq 50$$

$$35 \leq z \leq 36$$

In these cases, the thickness of the cobalt iron alloy layer may be set smaller than 1.0 [nm].

In particular, the coercivity equal to or smaller than 800[A/m] is preferably established in the cobalt nickel iron alloy layer in the direction of easy magnetization. In addition, the ratio $Hc_{(hard)}/Hc_{(easy)}$ of the coercivity $Hc_{(hard)}$ in the direction of hard magnetization to the coercivity $Hc_{(easy)}$ in the direction of easy magnetization is preferably set equal to or smaller than 0.7 in the cobalt nickel iron alloy layer. Furthermore, the cobalt nickel iron alloy layer preferably has the saturation magnetic density Bs equal to or larger than 1.7[T]. When all of three conditions are satisfied, the cobalt nickel iron alloy layer greatly contributes to a further reduction in the thickness of the free ferromagnetic layer.

It should be noted that the aforementioned ferromagnetic layered material may be applied to any purposes other than the free ferromagnetic layer in the magnetoresistive film.

BRIEF DESCRIPTION OF THE DRAWINGS

The above and other objects, features and advantages of the present invention will become apparent from the following description of the preferred embodiment in conjunction with the accompanying drawings, wherein.

DESCRIPTION OF THE PREFERRED EMBODIMENT

Figure 1:
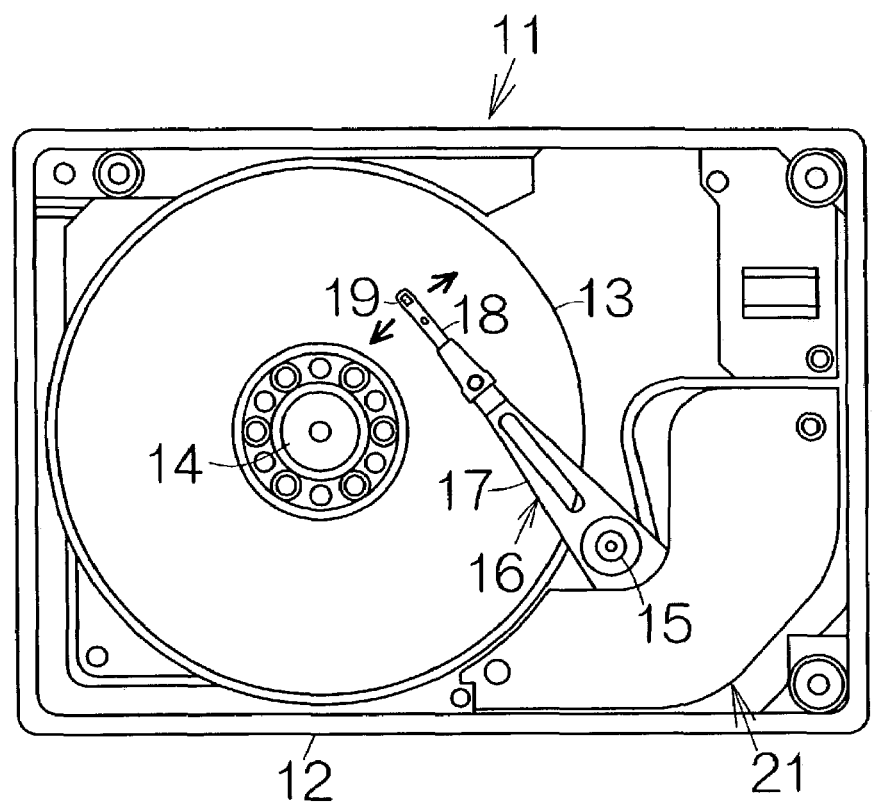
FIG. 1 is a plan view schematically illustrating the interior structure of a hard disk drive (HDD)

FIG. 1 schematically illustrates the inner structure of a hard disk drive (HDD) 11 as an example of a recording medium drive or storage device. The HDD 11 includes a box-shaped primary enclosure 12 defining an inner space of a flat parallelepiped, for example. At least one magnetic recording disk 13 is incorporated in the inner space within the primary enclosure 12. The magnetic recording disk 13 is mounted on the driving shaft of a spindle motor 14. The spindle motor 14 is allowed to drive the magnetic recording disk 13 for rotation at a higher revolution speed in a range between 4,200 rpm and 7,200 rpm or 10,000 rpm, for example. A cover, not shown, is coupled to the primary enclosure 12 so as to define the closed inner space between the primary enclosure 12 and itself.

A carriage 16 is also incorporated in the inner space of the primary enclosure 12. The carriage 16 is designed to swing about a vertical support shaft 15. The carriage 16 includes a rigid swinging arm 17 extending in the horizontal direction from the vertical support shaft 15, and an elastic head suspension 18 fixed to the tip end of the swinging arm 17. The elastic head suspension 18 extends forward from the swinging arm 17. As conventionally known, a flying head slider 19 is cantilevered at the head suspension 18 through a gimbal spring, not shown. The head suspension 18 serves to urge the flying head slider 19 toward the surface of the magnetic recording disk 13. When the magnetic recording disk 13 rotates, the flying head slider 19 is allowed to receive airflow generated along the rotating magnetic recording disk 13. The airflow serves to generate a lift on the flying head slider 19. The flying head slider 19 is thus allowed to keep flying above the surface of the magnetic recording disk 13 during the rotation of the magnetic recording disk 13 at a higher stability established by the balance between the lift and the urging force of the head suspension 18.

When the carriage 16 is driven to swing about the support shaft 15 during the flight of the flying head slider 19, the flying head slider 19 is allowed to cross the recording tracks defined on the magnetic recording disk 13 in the radial direction of the magnetic recording disk 13. This radial movement serves to position the flying head slider 19 right above a target recording track on the magnetic recording disk 13. In this case, an electromagnetic actuator 21 such as a voice coil motor (VCM) can be employed to realize the swinging movement of the carriage 16, for example. As conventionally known, in the case where two or more magnetic recording disks 13 are incorporated within the inner space of the primary enclosure 12, a pair of the elastic head suspensions 18 and the swinging arms 17 are disposed between the adjacent magnetic recording disks 13.

Figure 2:
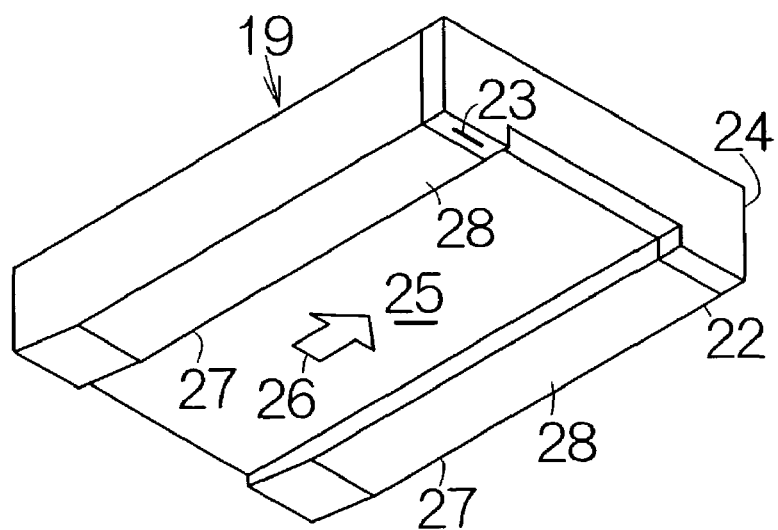
FIG. 2 is an enlarged perspective view schematically illustrating the structure of a flying head slider according to a specific example.

FIG. 2 illustrates a specific example of the flying head slider 19. The flying head slider 19 of this type includes a slider body 22 made of $Al_2O_3$—TiC in the form of a flat parallelepiped, and a head protection layer 24 coupled to the trailing or outflow end of the slider body 22. The head protection layer 24 may be made of $Al_2O_3$. A read/write electromagnetic transducer 23 is embedded in the head protection layer 24. A medium-opposed surface or bottom surface 25 is defined continuously over the slider body 22 and the head protection layer 24 so as to face the surface of the magnetic recording disk 13 at a distance. The bottom surface 25 is designed to receive airflow 26 generated along the surface of the rotating magnetic recording disk 13.

A pair of rails 27 are formed to extend over the bottom surface 25 from the leading or inflow end toward the trailing or outflow end. The individual rail 27 is designed to define an air bearing surface 28 at its top surface. In particular, the airflow 26 generates the aforementioned lift at the respective air bearing surfaces 28. The read/write electromagnetic transducer 23 embedded in the head protection layer 24 is designed to expose the front end at the air bearing surface 28 as described later in detail. A diamond-like-carbon (DLC) protection layer may additionally be formed to extend over the air bearing surface 28 to cover over the front end of the read/write electromagnetic transducer 23. The flying head slider 19 may take any shape or form other than the above-described one.

Figure 3:
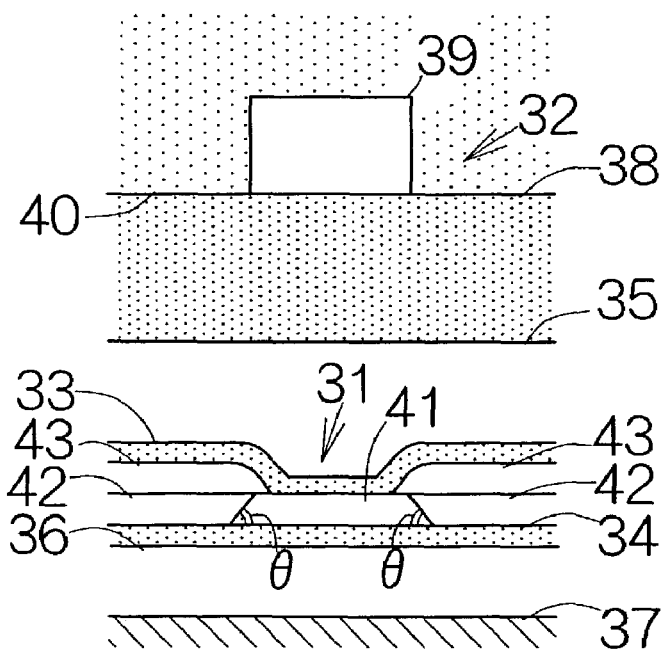
FIG. 3 is a front view schematically illustrating a read/write electromagnetic transducer observed at an air bearing surface.

As shown in FIG. 3 in detail, the read/write electromagnetic transducer 23 is formed as a so-called composite type thin film magnetic head. Specifically, the read/write electromagnetic transducer 23 includes a magnetoresistive (MR) read element 31 and a thin film magnetic or inductive write head 32. The MR read element 31 is designed to discriminate magnetic bit data based on variation in the electric resistance in response to an applied magnetic field from the magnetic recording disk 13. The thin film magnetic head 32 is designed to utilize a magnetic field induced at a conductive swirly coil pattern, not shown, so as to record magnetic bit data into the magnetic recording disk 13.

The MR read element 31 is interposed between upper and lower non-magnetic gap layers 33, 34. The upper and lower non-magnetic gap layers 33, 34 may be made of $Al_2O_3$ (alumina), for example. The non-magnetic gap layers 33, 34 interposing the MR read element 31 is interposed between upper and lower shield layers 35, 36. The upper and lower shield layers 35, 36 may be made of FeN, NiFe, or the like. The lower shield layer 36 extends over the surface of an $Al_2O_3$ (alumina) layer 37. The alumina layer 37 serves as the lower half layer of the aforementioned head protection layer 24, namely, the undercoat layer.

The thin film magnetic head 32 includes a non-magnetic gap layer 38 extending over the surface of the upper shield layer 35. The non-magnetic gap layer 38 may be made of $Al_2O_3$ (alumina), for example. An upper magnetic pole layer 39 is opposed to the upper shield layer 35. The non-magnetic gap layer 38 is interposed between the upper shield layer 35 and the upper magnetic pole layer 39. The upper magnetic pole layer 39 may be made of NiFe, for example. The upper magnetic pole layer 39 is covered with an $Al_2O_3$ (alumina) layer 40 extending over the non-magnetic gap layer 38. The alumina layer 40 is designed to interpose the MR read element 31 and the thin film magnetic head 32 between the aforementioned alumina layer 37 and itself. Specifically, the alumina layer 40 serves as the upper half layer of the head protection layer 24, namely, the overcoat layer.

The upper magnetic pole layer 39 and the upper shield layer 35 in combination serve to establish the magnetic core of the thin film magnetic head 32. Specifically, the upper shield layer 35 of the MR read element 31 is designed to additionally function as the lower magnetic pole layer of the thin film magnetic head 32. When a magnetic field is induced at the conductive swirly coil pattern, a magnetic flux is exchanged between the upper magnetic pole layer 39 and the upper shield layer 35. The non-magnetic gap layer 38 allows the exchanged magnetic flux to leak out of the air bearing surface 28. The thus leaked magnetic flux forms a magnetic field for recordation, namely, a write gap magnetic field. It should be noted that the upper shield layer 35 of the MR read element 31 may be dependent of the lower magnetic pole layer of the thin film magnetic head 32.

Figure 4:
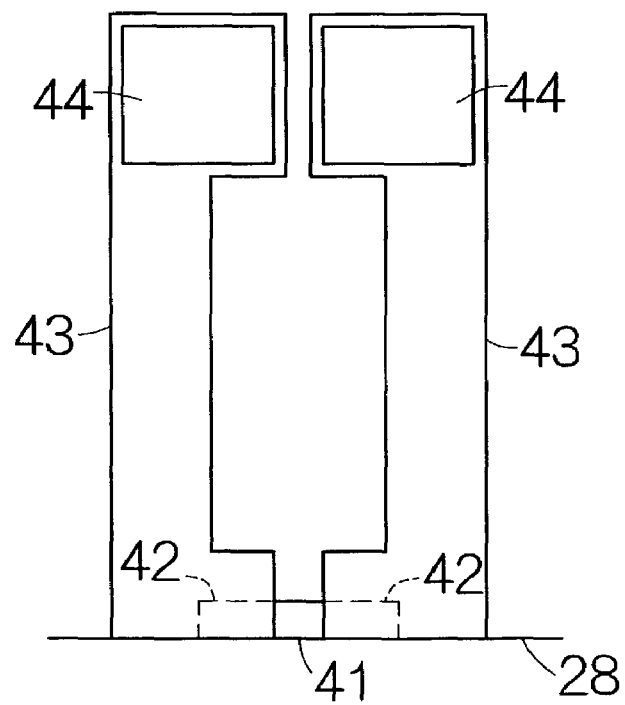
FIG. 4 is an enlarged plan view of a magnetoresistive (MR) read element.

Referring also to FIG. 4, the MR read element 31 includes a magnetoresistive (MR) film, namely, a spin valve film 41 extending along the air bearing surface 28 over the flat surface of the non-magnetic gap layer 34. A pair of end surfaces are defined on the spin valve film 41 so as to intersect, by an inclined angle θ, the flat surface of the non-magnetic gap layer 34.

Likewise, a pair of domain control hard magnetic films 42 are formed to extend along the air bearing surface 28 over the flat surface of the non-magnetic gap layer 34. The domain control magnetic hard films 42 are designed to interpose the spin valve film 41 along the air bearing surface 28 over the flat surface of the non-magnetic gap layer 34. The leading ends of the domain control hard magnetic films 42 are connected to the end surfaces of the spin valve film 41, respectively. The domain control hard magnetic films 42 may be made of a hard magnetic material such as CoPt, CoCrPt, or the like.

Lead layers 43 are formed to extend over the surface of the domain control hard magnetic layers 42. The lead layers 43 are interposed between the domain control hard magnetic films 42 and the upper shield layer 35. The leading or front ends of the lead layers 43 are connected to the end surfaces of the spin valve film 41 through the domain control hard magnetic films 42. A sensing current is supplied to the spin valve film 41 through the lead layers 43. The lead layers 43 may be made of a material having a higher electrical conductivity such as Cu, for example.

As shown in FIG. 4, the lead layers 43 are designed to extend rearward along the surface of the non-magnetic gap layer 34 from the front end exposed at the air bearing surface 28. Terminal pads 44 are respectively connected to the rear ends of the lead layers 43. The terminal pads 44 may extend on the surface of the lead layers 43. When the flying head slider 19 is fixed on the elastic head suspension 18, the terminal pads 44 are connected to terminal pads, not shown, on the elastic head suspension 18 through Au balls, not shown, for example.

Figure 5:
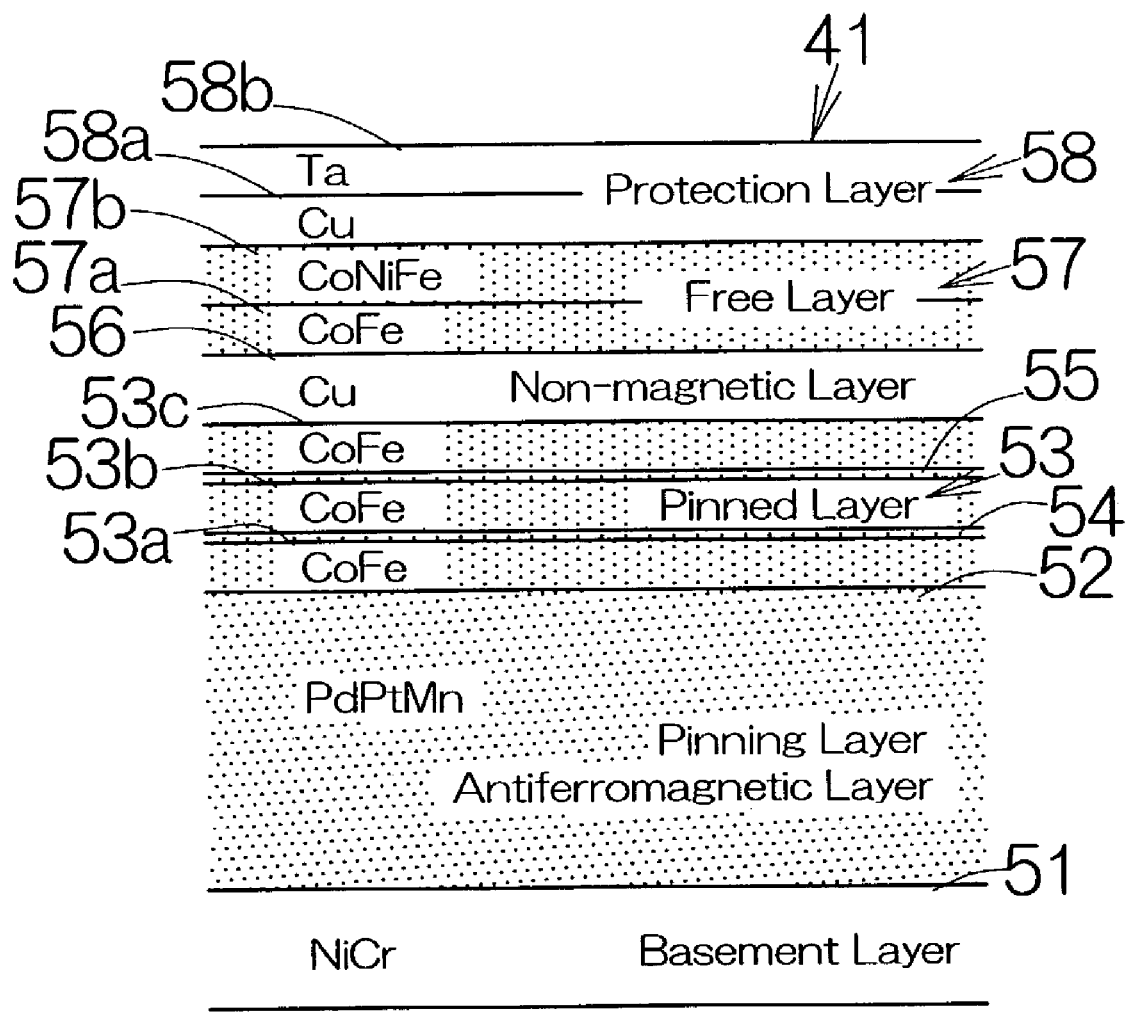
FIG. 5 is an enlarged front view schematically illustrating the structure of a spin valve film according to the present invention.

As shown in FIG. 5, the spin valve film 41 includes abasement layer 51 laid over the surface of the non-magnetic gap layer 34. The basement layer 51 may be made of a nickel chrome (NiCr) alloy layer, for example.

A pinning layer 52 is laid over the surface of the basement layer 51. The pinning layer 52 may be made of an antiferromagnetic alloy material such as PdPtMn, FeMn, or the like. Alternatively, the pinning layer 52 may be made of a hard magnetic material. A pinned ferromagnetic layer 53 is laid over the surface of the pinning layer 52. The pinned ferromagnetic layer 53 includes first, second and third cobalt iron (CoFe) alloy ferromagnetic layers 53a, 53b, 53c sequentially overlaid on the surface of the pinning layer 52. A ruthenium (Ru) coupling layer 54 is interposed between the first and second CoFe alloy ferromagnetic layers 53a, 53b. A specular film or oxidation layer 55 is interposed between the second and third CoFe alloy ferromagnetic layers 53b, 53c. Alternatively, the pinned ferromagnetic layer 53 may have the structure other than the above-described one. The pinning layer 52 serves to fix the magnetization in the pinned ferromagnetic layer 53 in a predetermined direction.

A non-magnetic intermediate layer 56 is laid over the surface of the pinned ferromagnetic layer 53. The non-magnetic intermediate layer 56 may be made of an electrically-conductive material such as Cu, for example. A free ferromagnetic layer 57 is laid over the surface of the non-magnetic intermediate layer 56. The free ferromagnetic layer 57 may include a cobalt iron (CoFe) alloy layer 57a extending over the surface of the non-magnetic intermediate layer 56, and a cobalt nickel iron (CoNiFe) alloy layer 57b extending over the surface of the CoFe alloy layer 57a. The surface of the free ferromagnetic layer 57 is covered with a protection layer 58. The protection layer 58 may include a copper (Cu) layer 58a and a cap or tantalum (Ta) layer 58b laid over the upper surface of the Cu layer 58a.

When the MR read element 31 is opposed to the surface of the magnetic recording disk 13 for reading magnetic information data, the magnetization of the free ferromagnetic layer 57 is allowed to rotate in the spin valve film 41 in response to the inversion of the magnetic polarity applied from the magnetic recording disk 13. The rotation of the magnetization in the free ferromagnetic layer 57 induces variation in the electric resistance of the spin valve film 41. When a sensing electric current is supplied to the spin valve film 41 through the lead layers 43, a variation in the level of any parameter such as voltage appears, in response to the variation in the magnetoresistance, in the sensing electric current output from the terminal pads 44. The variation in the level can be utilized to discriminate magnetic bit data recorded on the magnetic recording disk 13.

In this case, the aforementioned CoNiFe alloy layer 57b serves to reliably establish the uniaxial magnetic anisotropy in the free ferromagnetic layer 57 in the spin valve film 41. The establishment of the uniaxial magnetic anisotropy leads to a reliable rotation of the magnetization in the free ferromagnetic layer 57 when the magnetic field acts on the free ferromagnetic layer 57 from the magnetic recording disk 13. A reliable discrimination of magnetic bit data can be achieved. Moreover, the uniaxial magnetic anisotropy can reliably be established in the free ferromagnetic layer 57 irrespective of a reduced thickness of the CoFe alloy layer 57a as well as the CoNiFe alloy layer 57b. The spin valve film 41 exhibits a larger variation in the electric resistance, so that a larger amplitude of variation is allowed to appear in the output voltage at the terminal pads 44. An enhanced output can be obtained in this manner.

The present inventor have observed the characteristic of the aforementioned spin valve film 41. In the observation, the present inventor has deposited a layered material on a wafer in a vacuum atmosphere. The layered material included the NiCr layer of approximately 6.0 nm thickness, the PdPtMn layer of approximately 15.0 nm thickness, the first CoFe alloy ferromagnetic layer 53a of approximately 1.5 nm thickness, the Ru coupling layer 54 of approximately 0.85 nm thickness, and the second CoFe alloy ferromagnetic layer 53b of approximately 1.0 nm thickness, in this sequence. Sputtering was employed to deposit the layered material. Oxygen gas was introduced into the vacuum atmosphere after the second CoFe alloy ferromagnetic layer 53b has been deposited. The introduction of the oxygen gas was maintained for 70 seconds. The introduced oxygen gas serves to form the oxidation layer 55 over the surface of the second CoFe alloy ferromagnetic layer 53b. The vacuum atmosphere was again established after the formation of the oxidation layer 55. The inventor has thereafter deposited the third CoFe alloy ferromagnetic layer 53c of 1.5 nm thickness, the Cu layer of approximately 2.1 nm thickness, the CoFe alloy layer 57a of approximately 0.5 nm thickness, the CoNiFe alloy layer 57b of approximately 1.7 nm thickness, the Cu layer of approximately 1.2 nm thickness and the tantalum layer of approximately 3.0 nm thickness on the wafer in this sequence. Sputtering was likewise employed for the deposition. $Co_{90}Fe_{10}$ alloy (atom %) was employed for the CoFe alloy layers 53a, 53b, 53c, 57a. $Co_{41}Fe_{24}Ni_{35}$ alloy (atom %) was also employed for the CoNiFe alloy layer 57b. After the deposition has been completed, the PdPtMn layer was regularized based on a heat treatment. The spin valve film 41 of the first example was prepared in this manner. The inventor has measured the magnetoresistive (MR) ratio[%], the sheet electric resistance $\rho/t[\Omega]$, the variation in the electric resistance $\Delta\rho/t[\Omega]$, the magnetic coupling field Hin[A/m], and the magnetic coupling or pinning field Hua[kA/m] of the prepared spin valve film 41.

The inventor has also prepared the spin valve film of a comparative example. A spin valve film was formed in the aforementioned manner, except that the CoFe alloy layer 57a and the CoNiFe alloy layer 57b were replaced with a combination of a CoFe alloy layer of approximately 1.0 nm thickness and a NiFe layer of approximately 2.0 nm thickness in the free ferromagnetic layer 57. After the PdPtMn layer was regularized based on a heat treatment, the inventor has measured the magnetoresistive (MR) ratio [%], the sheet electric resistance $\rho/t[\Omega]$, the variation $\Delta\rho/t[\Omega]$ in the electric resistance, the magnetic coupling field Hin[A/m], and the magnetic coupling or pinning field Hua[kA/m] of the spin valve film of the comparative example.

TABLE 1

|  | MR Ratio [%] | $\Delta\rho/t$ [$\Omega$] | $\rho/t$ [$\Omega$] | Hin [A/m] | Hua [kA/m] |
| --- | --- | --- | --- | --- | --- |
| Example 1 | 12.2 | 2.22 | 18.1 | 294.4 | 113.8 |
| Comparative 1 | 11.5 | 1.81 | 15.8 | 748.0 | 131.3 |

Figure 6A:
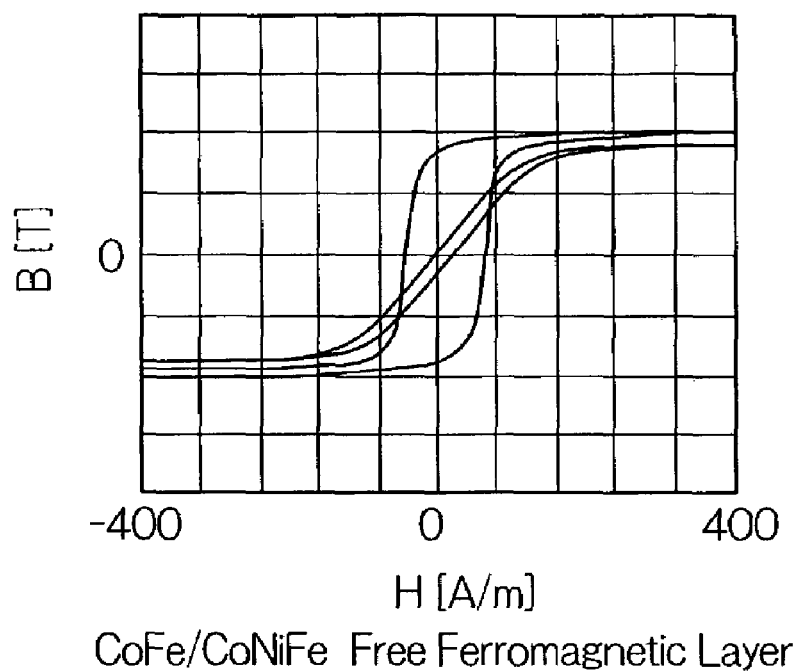
FIG. 6A is a graph showing the BH characteristic of the spin valve film according to a first example of the embodiment.
Figure 6B:
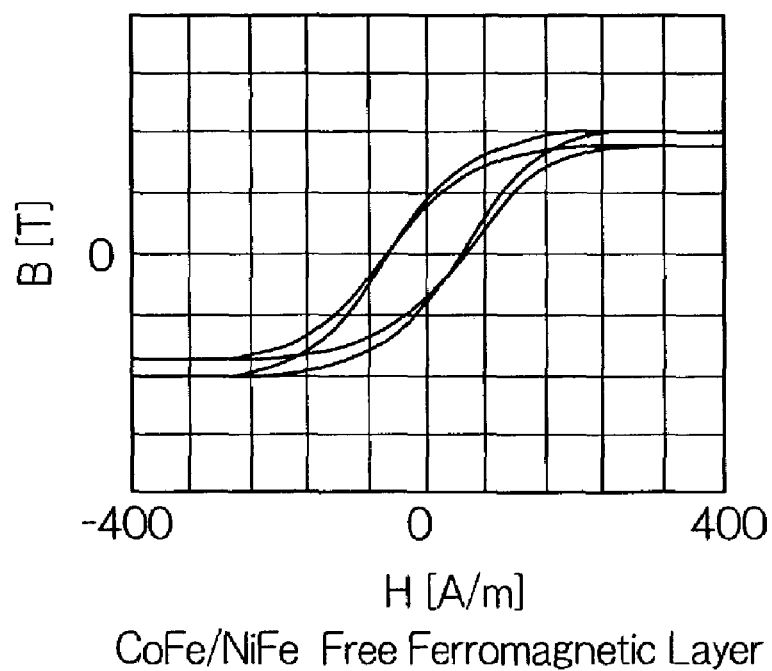
FIG. 6B is a graph showing the BH characteristic of the spin valve film according to a comparative example.

As is apparent from Table 1, the MR ratio was sufficiently improved in the spin valve film 41 of the first example as compared with the spin valve film of the comparative example. The spin valve film 41 of the first example exhibits a larger amplitude of variation $\Delta\rho/t$ in the electric resistance. Moreover, as shown in FIG. 6A, the uniaxial anisotropy has been confirmed in the spin valve film 41 of the first example irrespective of a reduced thickness. On the other hand, loss of the uniaxial anisotropy was observed in the spin valve film of the comparative example as shown in FIG. 6B.

The inventor has likewise prepared the spin valve film 41 of a second example. The present inventor has again deposited a layered material on a wafer in a vacuum atmosphere. The layered material included the NiCr layer of approximately 6.0 nm thickness, the PdPtMn layer of approximately 15.0 nm thickness, the first CoFe alloy ferromagnetic layer 53a of approximately 1.2 nm thickness, the Ru coupling layer 54 of approximately 0.85 nm thickness, and the second CoFe alloy ferromagnetic layer 53b of approximately 1.2 nm thickness, in this sequence. Sputtering was employed to deposit the layered material. Oxygen gas was introduced into the vacuum atmosphere after the second CoFe alloy ferromagnetic layer 53b has been deposited. The introduction of the oxygen gas was maintained for 90 seconds. The introduced oxygen gas serves to form the oxidation layer 55 over the surface of the second CoFe alloy ferromagnetic layer 53b. The vacuum atmosphere was again established after the formation of the oxidation layer 55. The inventor has thereafter deposited the third CoFe alloy ferromagnetic layer 53c of 1.7 nm thickness, the Cu layer of approximately 2.1 nm thickness, the CoFe alloy layer 57a of approximately 0.5 nm thickness, the CoNiFe alloy layer 57b of approximately 1.7 nm thickness and the Au layer of approximately 0.6 nm thickness on the wafer in this sequence. Sputtering was likewise employed for the deposition. $Co_{60}Fe_{40}$ alloy (atom %) was employed for the CoFe alloy layers 53a, 53b, 53c, 57a. $Co_{41}Fe_{24}Ni_{35}$ alloy (atom %) was also employed for the CoNiFe alloy layer 57b. After the deposition has been completed, the PdPtMn layer was regularized based on a heat treatment. The spin valve film 41 of the second example was prepared in this manner. The inventor has measured the magnetoresistive (MR) ratio [%], the sheet electric resistance $\rho/t[\Omega]$, the variation in the electric resistance $\Delta\rho/t[\Omega]$, the magnetic coupling field Hin[A/m], and the magnetic coupling or pinning field Hua[kA/m]of the prepared spin valve film 41.

The inventor has also prepared the spin valve film of a comparative example in the aforementioned manner. A spin valve film was formed in the aforementioned manner, except that the CoFe alloy layer 57a and the CoNiFe alloy layer 57b were replaced with a combination of a CoFe alloy layer of approximately 1.0 nm thickness and a NiFe layer of approximately 2.0 nm thickness in the free ferromagnetic layer 57. After the PdPtMn layer was regularized based on a heat treatment, the inventor has measured the magnetoresistive (MR) ratio [%], the sheet electric resistance $\rho/t[\Omega]$, the variation $\Delta\rho/t[\Omega]$ in the electric resistance, the magnetic coupling field Hin[A/m], and the magnetic coupling or pinning field Hua[kA/m] of the spin valve film of the comparative example.

TABLE 2

|  | MR Ratio [%] | $\Delta\rho/t$ [$\Omega$] | $\rho/t$ [$\Omega$] | Hin [A/m] | Hua [kA/m] |
| --- | --- | --- | --- | --- | --- |
| Example 2 | 15.5 | 2.60 | 16.7 | 262.6 | 98.7 |
| Comparative 2 | 14.4 | 2.32 | 16.2 | 803.7 | 81.2 |

As is apparent from Table 2, the MR ratio was sufficiently improved in the spin valve film 41 of the second example as compared with the spin valve film of the comparative example. The spin valve film 41 of the second example exhibits a larger amplitude of variation $\Delta\rho/t$ in the electric resistance. Moreover, the uniaxial anisotropy has been confirmed in the spin valve film 41 of the second example irrespective of a reduced thickness.

The inventor has observed the magnetic characteristic of the CoNiFe alloy layer 57b. The inventor has measured the saturation magnetic density Bs[T], the coercivity $Hc_{(easy)}$ [A/m] in the direction of easy magnetization and the coercivity $Hc_{(hard)}$ [A/m] in the direction of hard magnetization for various compositions of the CoNiFe alloy layer. As shown in Table 3, the uniaxial anisotropy has been observed in the CoNiFe alloy layers of the specific composition.

TABLE 3

| Composition[at %] | Bs[T] | Hc(easy)[A/m] | Hc(hard)/Hc(easy) |
|---|---|---|---|
| $Co_{72}Ni_9Fe_{19}$ | 1.78 | 748.0 | 0.70 |
| $Co_{63}Ni_{13}Fe_{24}$ | 1.81 | 843.5 | 0.74 |
| $Co_{54}Ni_{18}Fe_{28}$ | 1.85 | 851.5 | 0.75 |
| $Co_{48}Ni_{16}Fe_{36}$ | 1.75 | 819.6 | 0.72 |
| $Co_{46}Ni_{19}Fe_{35}$ | 1.79 | 859.4 | 0.76 |
| $Co_{42}Ni_{23}Fe_{35}$ | 1.72 | 756.0 | 0.68 |
| $Co_{41}Ni_{24}Fe_{35}$ | 1.75 | 342.2 | 0.52 |

Figure 7:
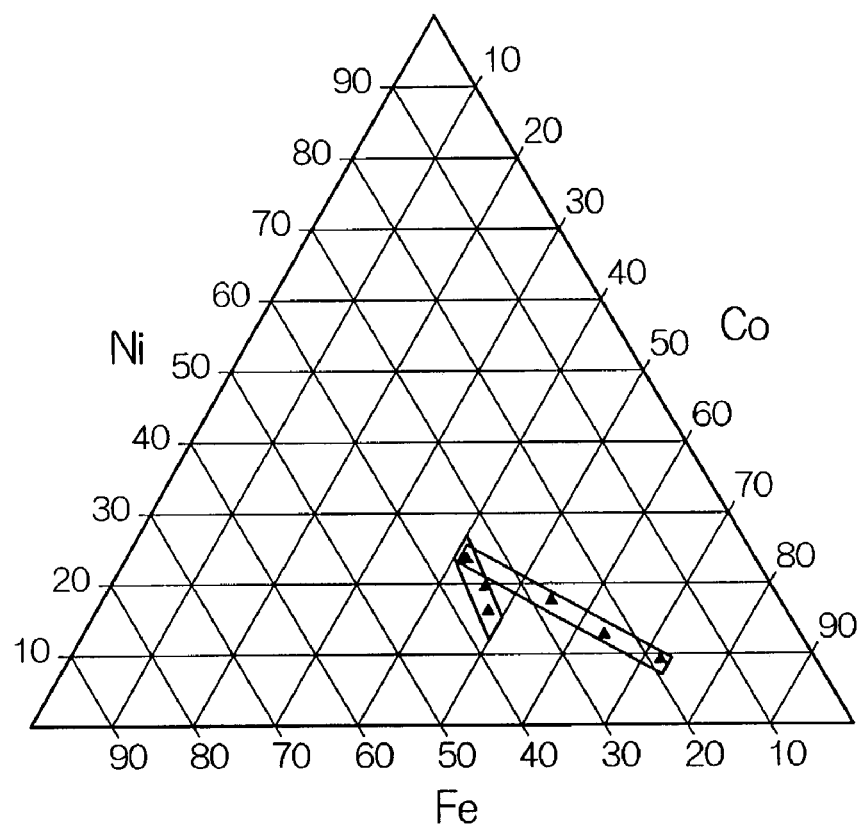
FIG. 7 is a graph showing the relationship between the composition of cobalt nickel iron (CoNiFe) alloy and the good magnetic characteristic.

The composition of the CoNiFe alloy layer can be determined based the result shown in FIG. 7 for establishment of the uniaxial anisotropy. Specifically, the CoNiFe layer should contain cobalt of x[atom %], nickel of y[atom %] and iron of z[atom %] in accordance with the following expression, for example:

$$100 = x + y + z$$

$$41 \leq x \leq 72$$

$$z = y + 10$$

Alternatively, the CoNiFe layer may contain cobalt of x[atom %], nickel of y[atom %] and iron of z[atom %] in accordance with the following expression:

$$100 = x + y + z$$

$$40 \leq x \leq 50$$

$$35 \leq z \leq 36$$

It should be noted that margins of plus and minus 2 [atom %] should be acceptable in the composition of the CoNiFe alloy. In particular, the thickness of the free ferromagnetic layer 57 can be reduced under conditions where the coercivity equal to or smaller than 800 [A/m] is established in the CoNiFe alloy layer in the direction of easy magnetization, and/or the ratio $HC_{(hard)}/Hc_{(easy)}$ of the coercivity $Hc_{(hard)}$ in the direction of hard magnetization to the coercivity $Hc_{(easy)}$ in the direction of easy magnetization is set equal to or smaller than 0.7 in the CoNiFe alloy layer, and/or the CoNiFe alloy layer has the saturation magnetic density Bs equal to or larger than 1.7 [T], for example.

Figure 8:
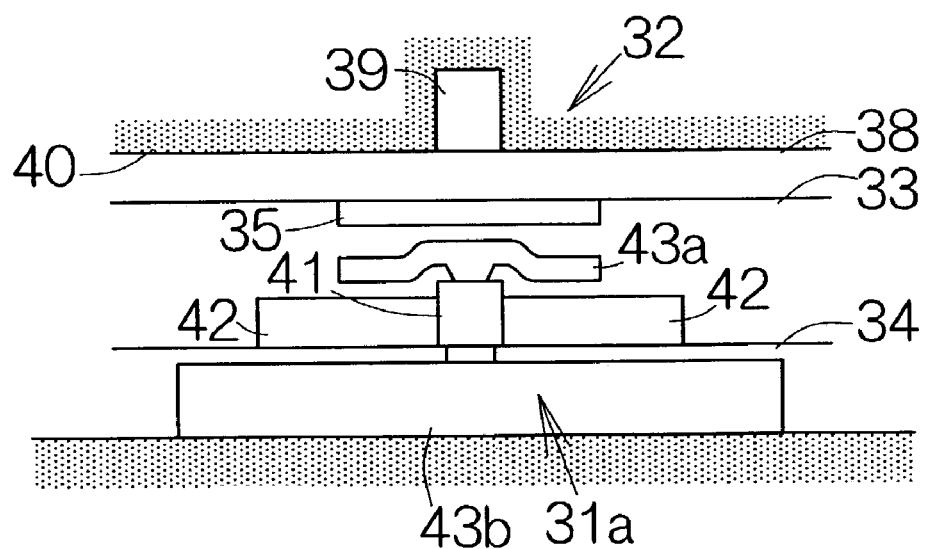
FIG. 8 is an enlarged plan view of a current-perpendicular-to-the-plane (CPP) structure MR read element.

As shown in FIG. 8, the spin valve film 41 may be incorporated in a so-called current-perpendicular-to-the-plane (CPP) structure MR read element 31a, for example. The spin valve film 41 is interposed between upper and lower electrode layers 43a, 43b in the CPP structure MR read element 31a. The spin valve film 41 is simply allowed to have the aforementioned structure. In this case, if the electrode layers 43a, 43b are made of an electrically-conductive magnetic material, the electrode layers 43a, 43b is allowed to additionally function as the upper and lower shield layers for the CPP structure MR read element 31a. Otherwise, like reference numerals are attached to the structures or components equivalent to those of the aforementioned MR read element 31. A reduced thickness of the free ferromagnetic layer 57 leads to a reduced space between the upper and lower shield layers in the CPP structure MR read element 31a. The linear resolution of magnetic recordation can thus be improved along the recording tracks on the magnetic recording disk 13.

Figure 9:
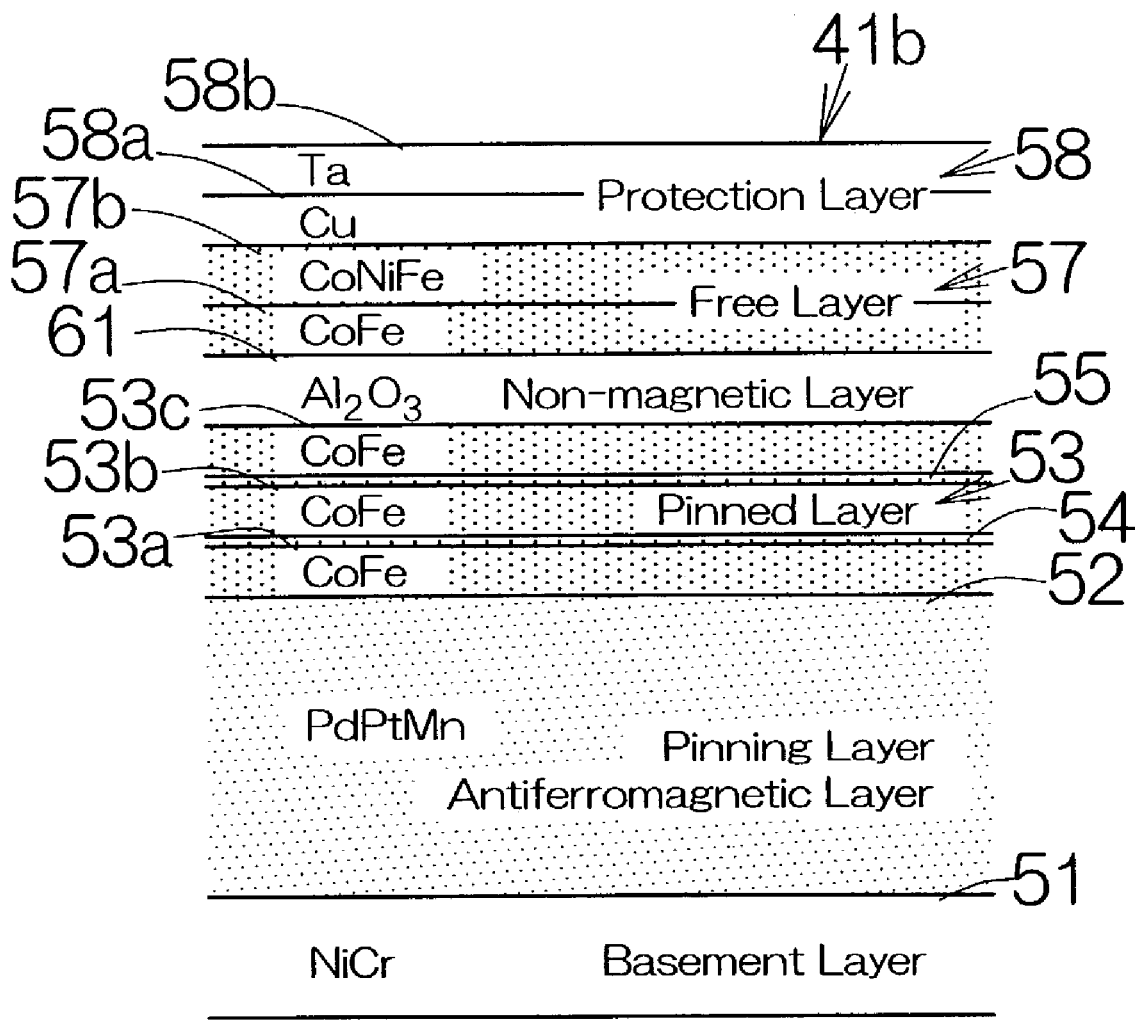
FIG. 9 is an enlarged front view of a tunnel-junction magnetoresistive (TMR) film.

The aforementioned spin valve film 41 may be replaced with a tunnel-junction magnetoresistive (TMR) film in the CPP structure MR read element 31a. As shown in FIG. 9, the above-described free ferromagnetic layer 57 may be incorporated within the TMR film 41b, for example. An insulating non-magnetic intermediate layer 61 is incorporated in place of the aforementioned conductive non-magnetic intermediate layer 56 in the TMR film 41b. Otherwise, like reference numerals are attached to the structures or components equivalent to those of the aforementioned spin valve film 41. If the free ferromagnetic layer 57 is incorporated in the TMR film 41b in this manner, a reduced thickness of the free ferromagnetic layer 57 leads to a reduced space between the upper and lower shield layers in the CPP structure MR read element 31a as described above. The linear resolution of magnetic recordation can thus be improved along the recording tracks on the magnetic recording disk 13.

It should be noted that the spin valve film 41 and TMR film 41b may be established as the type including the free ferromagnetic layer 57 below the pinned ferromagnetic layer 53.

What is claimed is:

1. A magnetoresistive film comprising:
a pinned ferromagnetic layer;
a free ferromagnetic layer made of a cobalt nickel iron alloy layer and a cobalt iron alloy layer;
an intermediate layer interposed between the pinned and free ferromagnetic layers; and
a pinning layer contacting the pinned ferromagnetic layer, wherein the cobalt nickel iron alloy layer contains cobalt of x atom %, nickel of y atom % and iron of z atom % based on a following expression:

$$100 = x + y + z$$

$$41 \leq x \leq 72$$

$$z = y + 10$$

so as to establish uniaxial magnetic anisotropy in the cobalt iron alloy layer.

2. The magnetoresistive film according to claim 1, wherein said intermediate layer is made of an electrically-conductive material.

3. The magnetoresistive film according to claim 2, wherein said pinning layer is an antiferromagnetic layer.

4. The magnetoresistive film according to claim 3, wherein coercivity equal to or smaller than 800 [A/m] is established in the cobalt nickel iron alloy layer in a direction of easy magnetization.

5. The magnetoresistive film according to claim 4, wherein ratio $Hc_{(hand)}/Hc_{(easy)}$ of coercivity $Hc_{(hand)}$ in a direction of hard magnetization to the coercivity Hc(easy) in the direction of easy magnetization is set equal to or smaller than 0.7 in the cobalt nickel iron alloy layer.

6. The magnetoresistive film according to claim 5, wherein the cobalt nickel iron alloy layer has a saturation magnetic density (Bs) equal to or larger than 1.7 [T].

7. The magnetoresistive film according to claim 1, wherein thickness of the cobalt iron alloy layer is set smaller than 1.0 [nm].

8. The magnetoresistive film according to claim 1, wherein $$50 \leq x \leq 72.$$

9. A ferromagnetic layered material comprising:
a cobalt nickel iron alloy layer; and
a cobalt iron alloy layer laid over the cobalt nickel iron alloy layer, wherein the cobalt nickel iron alloy layer contains cobalt of x atom %, nickel of y atom % and iron of z atom % based on a following expression:

$100 = x + y + z$ $41 \leq x \leq 72$ $z = y + 10$ so as to establish uniaxial magnetic anisotropy in the cobalt iron alloy layer.

10. The ferromagnetic layered material according to claim 9, wherein coercivity equal to or smaller than 800 [A/m] is established in the cobalt nickel iron alloy layer in a direction of easy magnetization.

11. The ferromagnetic layered material according to claim 10, wherein ratio $Hc_{(hard)}/Hc_{(easy)}$ of coercivity $Hc_{(hard)}$ i coercivity $Hc_{(easy)}$ in the direction of easy magnetization is set equal to or smaller than 0.7 in the cobalt nickel iron alloy layer.

12. The ferromagnetic layered material according to claim 11, wherein the cobalt nickel iron alloy layer has a saturation magnetic density (Bs) equal to or larger than 1.7 [T].

13. The ferromagnetic layered material according to claim 9, wherein thickness of the cobalt iron alloy layer is set smaller than 1.0.

14. The ferromagnetic layer material according to claim 9, wherein $50 \leq x \leq 72$.

* * * * *

UNITED STATES PATENT AND TRADEMARK OFFICE
CERTIFICATE OF CORRECTION

| | | |
|---|---|---|
| PATENT NO. | : 7,292,415 B2 | Page 1 of 1 |
| APPLICATION NO. | : 10/328437 | |
| DATED | : November 6, 2007 | |
| INVENTOR(S) | : Noma | |

It is certified that error appears in the above-identified patent and that said Letters Patent is hereby corrected as shown below:

Col. 11, line 17, after "$Hc_{(hard)}$" insert --in a direction of hard magnetization to the--.

Col. 12, line 9, after "1.0" insert --[nm]--.

Signed and Sealed this

Thirteenth Day of May, 2008

JON W. DUDAS
*Director of the United States Patent and Trademark Office*